(12) United States Patent
Zhang

(10) Patent No.: US 9,189,374 B2
(45) Date of Patent: Nov. 17, 2015

(54) AUTOMATIC TEST SYSTEM FOR DISTRIBUTED COMPREHENSIVE SERVICE AND METHOD THEREOF

(75) Inventor: Hongqiang Zhang, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 31 days.

(21) Appl. No.: 13/258,437

(22) PCT Filed: Jun. 29, 2010

(86) PCT No.: PCT/CN2010/074754
§ 371 (c)(1),
(2), (4) Date: Oct. 12, 2011

(87) PCT Pub. No.: WO2011/060642
PCT Pub. Date: May 26, 2011

(65) Prior Publication Data
US 2012/0221279 A1 Aug. 30, 2012

(30) Foreign Application Priority Data
Nov. 23, 2009 (CN) .......................... 2009 1 0222629

(51) Int. Cl.
*G01R 31/28* (2006.01)
*G06F 19/00* (2011.01)
*G06F 11/36* (2006.01)

(52) U.S. Cl.
CPC .................................. *G06F 11/3688* (2013.01)

(58) Field of Classification Search
CPC ....................................................... G06G 19/00
USPC ........................................................ 702/108
See application file for complete search history.

(56) References Cited

U.S. PATENT DOCUMENTS 5,630,049 A * 5/1997 Cardoza et al. ................. 714/25
5,675,800 A * 10/1997 Fisher et al. ...................... 713/2
(Continued)

FOREIGN PATENT DOCUMENTS

CN 1832433 A 9/2006
CN 1987819 A 6/2007
(Continued)

OTHER PUBLICATIONS

International Search Report for PCT/CN2010/074754 dated Sep. 21, 2010.

*Primary Examiner* — Sujoy Kundu
*Assistant Examiner* — Alvaro Fortich
(74) *Attorney, Agent, or Firm* — Ling Wu; Stephen Yang; Ling and Yang Intellectual Property

(57) ABSTRACT

An automatic test system and method for a distributed comprehensive service are disclosed. The system has a client (101), a scheduling server (102) and testing subsystems (103) which are in a distributed deployment and used to test tested systems (104) that are also in a distributed deployment. The scheduling server (102) receives and analyzes test tasks sent from the client (101), schedules test items according to the logical relationship and distributes them to the corresponding testing subsystems (103). The test subsystems (103) analyze and execute the test items to test the tested systems (104), collect test item execution reports and send the execution reports to the scheduling server (102). The scheduling server (102) generates a test task report and sends to the client (101) for examination. The system supports complicated multi-service test scenarios and multi-test task execution.

7 Claims, 7 Drawing Sheets

(56) References Cited

U.S. PATENT DOCUMENTS

| | | | |
|---|---|---|---|
| 5,742,754 A * | 4/1998 | Tse | 714/38.14 |
| 5,781,720 A * | 7/1998 | Parker et al. | 714/38.11 |
| 5,941,947 A * | 8/1999 | Brown et al. | 709/225 |
| 6,243,835 B1 * | 6/2001 | Enokido et al. | 714/38.1 |
| 6,473,896 B1 * | 10/2002 | Hicken et al. | 717/132 |
| 6,505,137 B1 * | 1/2003 | Evans et al. | 702/119 |
| 6,701,364 B1 * | 3/2004 | Meyer | 709/224 |
| 6,895,539 B1 * | 5/2005 | Aragona | 714/724 |
| 7,152,189 B2 * | 12/2006 | Fuller et al. | 714/43 |
| 7,243,268 B2 * | 7/2007 | Bingham | 714/43 |
| 7,272,822 B1 * | 9/2007 | Riggins et al. | 717/124 |
| 7,308,491 B2 * | 12/2007 | Gosewehr | 709/221 |
| 7,421,621 B1 * | 9/2008 | Zambrana | 714/38.14 |
| 7,437,275 B2 * | 10/2008 | Sathe et al. | 702/189 |
| 7,490,319 B2 * | 2/2009 | Blackwell et al. | 717/124 |
| 7,539,591 B2 * | 5/2009 | House et al. | 702/122 |
| 7,539,950 B2 * | 5/2009 | Pankovcin | 715/853 |
| 7,543,277 B1 * | 6/2009 | Righi et al. | 717/125 |
| 7,546,584 B2 * | 6/2009 | Rovang | 717/124 |
| 7,613,599 B2 * | 11/2009 | Bade et al. | 703/14 |
| 7,620,856 B2 * | 11/2009 | Kagan et al. | 714/57 |
| 7,650,595 B2 * | 1/2010 | Qadeer et al. | 717/127 |
| 7,788,699 B2 * | 8/2010 | Largman et al. | 726/1 |
| 7,810,070 B2 * | 10/2010 | Nasuti et al. | 717/124 |
| 7,831,962 B2 * | 11/2010 | Banerjee et al. | 717/126 |
| 7,840,851 B2 * | 11/2010 | Hayutin | 714/46 |
| 7,856,624 B2 * | 12/2010 | Plum | 717/140 |
| 7,861,158 B2 * | 12/2010 | Martin et al. | 715/243 |
| 7,870,504 B1 * | 1/2011 | McIntosh et al. | 715/803 |
| 7,921,206 B2 * | 4/2011 | Nagaraja et al. | 709/224 |
| 7,984,428 B1 * | 7/2011 | Seymour | 717/125 |
| 8,024,169 B2 * | 9/2011 | Galgali et al. | 703/21 |
| 8,103,913 B2 * | 1/2012 | Zambrana | 714/38.1 |
| 8,166,448 B2 * | 4/2012 | Mitra et al. | 717/100 |
| 8,185,877 B1 * | 5/2012 | Colcord | 717/127 |
| 8,191,071 B2 * | 5/2012 | Noll et al. | 718/105 |
| 8,260,602 B1 * | 9/2012 | Hamon | 703/22 |
| 8,464,224 B2 * | 6/2013 | Dulip et al. | 717/128 |
| 8,589,886 B2 * | 11/2013 | Lavie et al. | 717/124 |
| 2003/0014510 A1 * | 1/2003 | Avvari et al. | 709/223 |
| 2003/0115252 A1 * | 6/2003 | Boudnik et al. | 709/202 |

FOREIGN PATENT DOCUMENTS

| | | |
|---|---|---|
| CN | 101140541 A | 3/2008 |
| CN | 101727389 A | 6/2010 |

* cited by examiner

| 301 Message communication module | 304 Subsystem registration module | 308 Test task analysis module | 302 File transmission module (server) |
| --- | --- | --- | --- |
| | 305 Subsystem management module | 309 Test task/item mapping module | |
| | 306 Subsystem inquiry module | 310 Test task scheduling module | |
| | 307 Test task control module | 311 Test task report module | |
| | 303 Exception handling module | | |

FIG. 3

| 401 Message communication module | 404 Deployment module | 405 Registration module | 402 File transmission module (subsystem) |
| --- | --- | --- | --- |
| | 406 Test item analysis module | 407 Test item scheduling module | |
| | 408 Scheduling control module | 409 Test item report module | |
| | 403 Exception handling module | | |

FIG. 4

AUTOMATIC TEST SYSTEM FOR DISTRIBUTED COMPREHENSIVE SERVICE AND METHOD THEREOF

TECHNICAL FIELD

The present invention relates to the field of software test technology, and more particularly, to an automatic test system for a distributed comprehensive service and an automatic test method for a distributed comprehensive service.

BACKGROUND OF THE RELATED ART

Along with the progress of the society and the improvement of people's living standard, software is increasingly penetrating into all aspects of our living, and with the expansion and depth of software applications, the software system is more and more complicated. In order to cut the cost, shorten the time for the software delivery and improve the software stability, software enterprises are always pursuing for improving the test efficiency.

For relatively mature software products, software development organizations generally use automatic test tools; for complicated software systems, however, it needs to fulfill not only the interface and service test for a certain subsystem, but also the comprehensive service test across several subsystems, and meanwhile, it generally needs to solve the problem of distribution.

When testing a single software subsystem, different test tools, such as a graphical user interface (GUI) test tool or a performance test tool, can be applied for different services respectively; these used to be "powerful" test tools, however, are not powerful enough for the automatic test among different services in one software subsystem or among several software subsystems.

At present, there is no solution for automatically testing comprehensive services between different subsystems that are distributed deployed.

CONTENT OF THE INVENTION

The present invention provides an automatic test system and an automatic test method for distributed comprehensive service to solve the problem that the comprehensive service test cannot be fulfilled since the existing automatic test tools and test schemes can only test a single service or a single subsystem.

In order to solve the above mentioned problem, the present invention provides an automatic test system for distributed comprehensive service, and the system comprises a client, a scheduling server and testing subsystems that are in a distributed deployment, for testing tested systems that are in a distributed deployment, wherein:

said client is configured to generate a test task by organizing test items according to a logic relationship, after starting up a test, send the test task to the scheduling server, and receive a test task report from the scheduling server and examine the test task report;

said scheduling server is configured to analyze the test task, schedule the test items according to the logical relationship, distribute each test item to the corresponding testing subsystems, collect test item execution reports reported by the testing subsystems and generate the test task report to be examined by the client; and each testing subsystem is configured to analyze and execute the test item so as to test the tested system, collect the test item execution report and report to the scheduling server.

Preferably, said clients, said scheduling server, said testing subsystems and said tested systems are distributed deployed and are connected via network, wherein:

one scheduling server provides service for at least one client and at least one identical or different testing subsystem;

one client is only connected with one scheduling server, and one client runs one or more test tasks at the same time;

one testing subsystem is only connected with one scheduling server, and is only connected with one tested system; and one tested system is connected with one or more testing subsystems.

Preferably, said test item is a set of a series of operations which can be identified and executed by the testing subsystems, and each test item has one type identification which corresponds to the type of the testing subsystem one-to-one.

Preferably, said logical relationship comprises primary scheduling rules such as branch, cycle and concurrent supported by the test items, as well as auxiliary scheduling rules such as delay and evaluation.

Preferably, said client is further configured to monitor the state of the test task in real time, and pause, resume or stop the scheduling by the scheduling server; and said scheduling server is further configured to send real-time execution state information of the test task to the client to perform real-time monitor during scheduling the test task.

Preferably, said test task adopts a form of logical level folder, and a task file and at least one test suit folder are contained in a test task folder;

one test suit file and at lest one test case folder are contained in each test suit folder; and one test case file and at least one test item folder are contained in each test case folder, and each test item folder contains one test item file.

The present invention also provides an automatic test method for distributed comprehensive service, wherein, a client, a scheduling server and testing subsystems that are in a distributed deployment are used to test the tested systems that are in the distributed deployment, and the method comprises:

generating a test task by organizing test items according to a logical relationship at the client, and sending the test task to the scheduling server after starting up a test;

the scheduling server analyzing the test task, scheduling the test items according to the logical relationship, and distributing each test item to the corresponding testing subsystem which analyze and execute the test item so as to test the tested system; and the testing subsystems collecting test item execution reports and reporting to the scheduling server, and the scheduling server collecting the test item execution reports, generating a test task report and sending the test task report to the client.

Preferably, said test item is a set of a series of operations which can be identified and executed by the testing subsystems, and each test item has one type identification (ID) which corresponds to the type of the testing subsystem one-to-one.

Preferably, said test task adopts a form of logical level folder, and a task file and at least one test suit folder are contained in a test task folder;

one test suit file and at lest one test case folder are contained in each test suit folder;

one test case file and at least one test item folder are contained in each test case folder, and each test item folder contains one test item file; and said logical relationship comprises primary scheduling rules such as branch, cycle and concurrent supported by the test items, as well as auxiliary scheduling rules such as delay and evaluation.

Preferably, said method further comprises: during scheduling the test task, the scheduling server sending real-time execution state information of the test task to the client to perform real-time monitor; monitoring the state of the test task in real time at the client; and pausing, resuming or stopping the scheduling by the scheduling server at the client.

In the automatic test system and method for distributed comprehensive service in accordance with the present invention, the primary element of the test task is the test items, and the test task selects or creates suitable test items according to the test requirements, and then performs logic controls, such as cycle, branch, concurrent or delay, on the test items, thereby the test items and the control logic of the test items compose the test task. This makes the creation and edition of the test task are more flexible. In this test system, more types of tested systems can be connected to be tested, thus the test methods and types are more enriched. Therefore, the automatic test system and method for distributed comprehensive service in the present invention is more flexible and can be more widely used.

In the automatic test system and method for the distributed comprehensive service in the present invention, the comprehensive service are mainly embodied in the difference between the test items, each test item has one type ID, and this type ID corresponds to the type of the testing subsystem one-to-one. When scheduling the test task, the scheduling server selects the most suitable testing subsystem according to the type ID of the test item and according to the rules of idle first or user designating first, and then sends the test item to the testing subsystem to analyze and execute. Since one test task might comprise different types of test items, a plurality of tested systems can be tested when executing the test tasks, and the test order can be controlled, thus to achieve the automatic test of the comprehensive service.

In the automatic test system and method for distributed comprehensive service in the present invention, the distribution is mainly embodied in the communication between the client, the scheduling server and the testing subsystems, and the communication between them is mainly control flow and data flow communication that takes network protocol such as the TCP protocol as the basic. Thus each module can be located in different computers, as long as they are in the same network, so that the test can get rid of the restriction in physical space.

To sum up, the automatic test system and method for distributed comprehensive service in the present invention achieves distribution via the network connection among the clients, the scheduling server and the testing subsystems in the system, and achieves supporting of the complicated multi-service test scenario by distinguishing the types of the test items, designating the test systems for operating the test items and supporting the structuralized test script in the test case; moreover, the system also supports execution modes such as concurrency, sequence, and timing of a plurality of test tasks, and controls whether to operate each part in the test task or not; and, with the system, the test width and depth can be significantly extended and the test efficiency can be extremely improved.

BRIEF DESCRIPTION OF DRAWINGS

FIG. 3 is a module diagram of a scheduling server 102 in accordance with the present invention;

FIG. 4 is a module diagram of a testing subsystem 103 in accordance with the present invention;

PREFERRED EMBODIMENTS OF THE PRESENT INVENTION

In order to make the purpose, technical scheme and advantages of the present invention are more evident, the present invention will be illustrated in more detail in combination with the accompanying drawings.

In order to solve the problem of automatically testing the comprehensive service between several distributed systems, the present invention provides an automatic test system and an automatic test method for the distributed comprehensive service. Wherein, the test system is a test platform, and it has no obvious relationship with the testing subsystem for a specific service; and with extension, any testing subsystem for the specific service can be hitched under the test platform. Thus the testing subsystem is not important in the present invention.

The test platform constructed by the test system in the present invention introduces a concept of test items. The test item is the basic test script identified and executed by the testing subsystems, and each test item has one type identification (ID) which corresponds to the type of the testing subsystem one-to-one. The functions provided by the test platform can assemble a variety of test items into a structuralized test script to form a test task, so as to support comprehensive test function for multi-service by scheduling the script. Of course, a distributed deployment is supported between the test platform and tested systems. This makes creation and edition of a test task more flexible. And more types of tested systems can be connected with the test system to be tested so that the test methods and types are more enriched. Therefore, the automatic test system and the automatic test method for distributed comprehensive service in the present invention are more flexible and can be more widely used.

Figure 1:
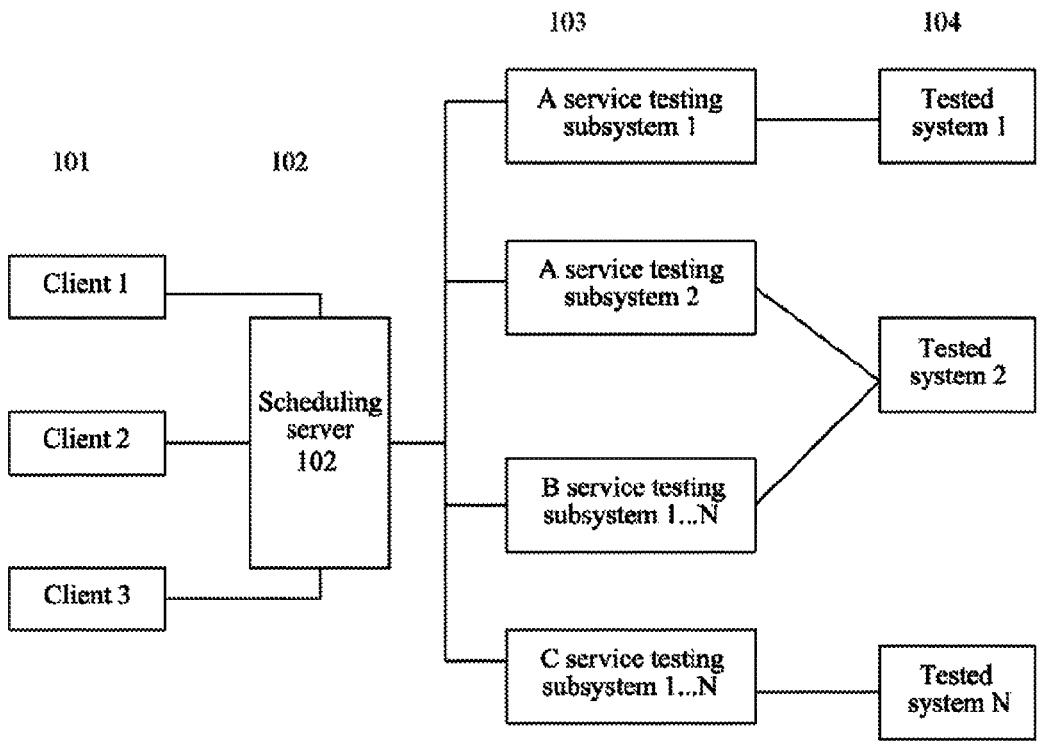
FIG. 1 is a schematic diagram of a structure of an automatic test system in accordance with the present invention.

FIG. 1 shows an automatic test system for distributed comprehensive service, and the system comprises clients 101, a scheduling server 102 and testing subsystems 103 that are in a distributed deployment for testing the tested systems 104 that are in a distributed deployment, wherein:

the client 101 is configured to generate a test task by organizing test items according to a logical relationship, send the test task to the scheduling server 102 after starting up the test, and receive a test task report from the scheduling server 102 and examine the test task report;

the scheduling server 102 is configured to analyze the test task, schedule the test items according to the logical relationship, and distribute the test items to the corresponding testing subsystems 103; and the testing subsystem 103 is configured to analyze and execute the test item so as to test the tested system 104, and collect test item execution reports and report the test item execution reports to the scheduling server 102 which collects the test item execution reports and generates the test task report to examine by the client 101.

The connection between the client 101, the scheduling server 102, the testing subsystem 103 and the tested system 104 that are in the distributed deployment can be that:

one scheduling server serves for at least one client and at least one identical or different testing subsystem;

one client can only be connected with one scheduling server, and one client operates more than one test task at the same time;

one testing subsystem can only be connected with one scheduling server, and can only be connected with one tested system; and one tested system is connected with one or more testing subsystems.

The communication both between the client and the scheduling server and between the testing subsystem and the scheduling server applies a TCP protocol, wherein both the client and the testing subsystem only communicate with the scheduling server. The communication method comprises control flow and data flow, where control flow is used to respond all kinds of control commands, and the data flow is used to transport the test task, the test items or the test report.

In practical implementation, the automatic test system shown in FIG. 1 can comprise only one scheduling server 102; at least one client 101 connected with the scheduling server 102; at least one testing subsystem 103 connected with the scheduling server 102; and several tested systems 104; wherein, the testing subsystem 103 can be connected with only one tested system 104, but one tested system 104 can be connected with several testing subsystems 103.

The scheduling server 102 is configured to fulfill the registration and management of the clients and the testing subsystems, analysis and schedule of the test tasks, distribution of each test item in the test task, collection and cleaning up of the test reports, and supporting of multilevel variables. As shown in FIG. 1, the scheduling server 102 is responsible for managing at least one client 101 and at least one testing subsystem 103; receiving and analyzing each test task sent by the client 101; scheduling each test task and monitoring the state of each test task; generating the report of each test task; responding a variety of control commands sent by the client 101; sending, according a certain rule, the test items in the test tasks to the testing subsystem 103 to be executed.

The client 101 is responsible for test case edition, test case management, an real time operating state monitoring, report examining, use case operating control, and some other assistant functions. One test system can have several clients, and each client works independently. Referring to FIG. 1, each client 101 is responsible for interacting with users. The users can create a new test task via the client 101, operate the test task, control the operating state, monitor the operating state of the test task, receive and analyze the test task operation report.

The testing subsystem 103 is configured to execute one kind of test, such as GUI test or performance test, for one tested system. The testing subsystem 103 receives the test items sent by the scheduling server 102, analyzes and executes the test items, collects the test item reports, feeds them back to the scheduling server 102, and enters into the state of waiting for the test items.

The tested system 104, as the test object, is the action object of the testing subsystem 103. The testing subsystem 103 generally controls the tested system 104 via a TCP/IP communication mode or a mode for being resident in the tested system 104, thus to execute a specific test, and in particular, the testing subsystem 103 executes the test items for the tested system 104.

Figure 2:
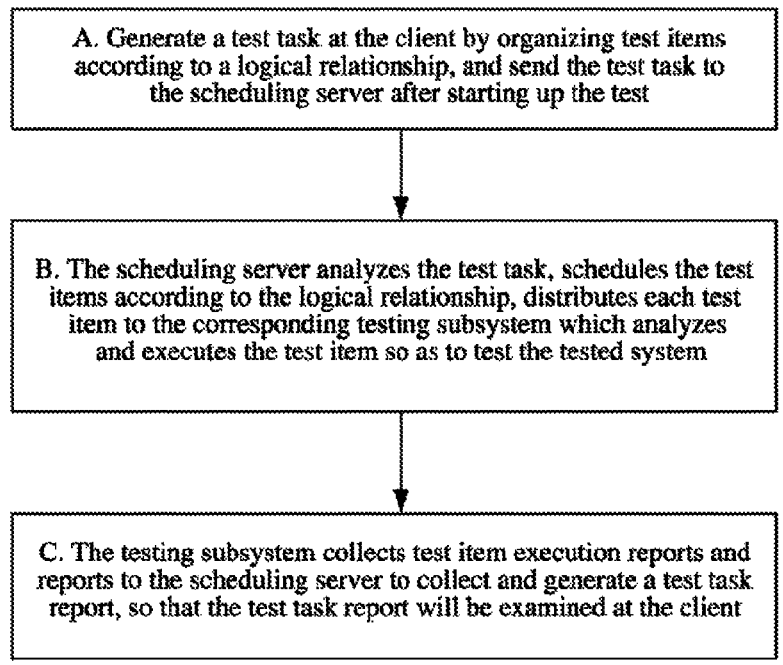
FIG. 2 is a flow chart of an automatic test method in accordance with the present invention.

Based on the automatic test system shown in FIG. 1, the automatic test method for the distributed comprehensive service in the present invention, as shown in FIG. 2, comprises:

A. generating a test task at the client by organizing test items according to a logical relationship, and sending the test task to the scheduling server after starting up the test;

B. the scheduling server analyzing the test task, scheduling the test items according to the logical relationship, distributing each test item to the corresponding testing subsystem which analyzes and executes the test item so as to test the tested system; and C. the testing subsystem collecting test item execution reports and reporting them to the scheduling server which collects the test item execution reports and generates a test task report, so that the test task report will be examined at the client.

Wherein, the client is mainly as the GUI between the automatic test system and the testing personnel. The testing personnel can write the test task, monitor the executing state and examine the report at the client. One abovementioned client can only be connected with one scheduling server, and one abovementioned client can run a plurality of test tasks at the same time.

Wherein, the scheduling server receives the test task written by the client and schedules logic of the test task, sends the test items in the test task to each testing subsystem to execute according to a certain distribution rule during the scheduling process, receives the test item execution report from the testing subsystem, and collects all the test item execution reports and sends them to the client. During the process of scheduling the test task, the scheduling server sends execution state information of the test task to the client, so that the users can perform to monitor in real time. Meanwhile, the users can pause, resume or stop the scheduling by the scheduling server at the client. The scheduling server supports the concurrent scheduling of a plurality of test tasks.

Wherein, the inputs of the testing subsystem are the test items. The test items are a set of a series of operations to be executed by the testing subsystems. The test items have a uniform structure, but their content is different according to the difference in the testing subsystems. The content of the test items is analyzed, executed only in the testing subsystems, and after the testing subsystems execute the test items, they must return specially formatted test item execution reports to the scheduling server. One testing subsystem can only be connected with one scheduling server.

The automatic test method and system in the present invention will be illustrated in detail in combination with the accompanying drawings.

In the automatic test system of the present invention shown in FIG. 1, the scheduling server 102 is a core. FIG. 3 is a module structural diagram of the scheduling server 102. The scheduling server 102 comprises: a message communication module 301, a file transmission module (server) 302, an exception handling module 303, a subsystem registration module 304, a subsystem management module 305, a subsystem inquiry module 306, a test task control module 307, a test task analysis module 308, a test task/item mapping module 309, a test task scheduling module 310, and a test task report module 311. Wherein:

the message communication module 301 is configured to fulfill network message communication with the clients and the testing subsystems;

the file transmission module (server) 302 is configured to provide file transmission service to the clients and the testing subsystems;

the exception handling module 303 is configured to provide to other modules the universal service for the exception state processing; the subsystem registration module 304 is configured to respond registration requests from the clients and the testing subsystems, allocate the corresponding resource to each testing subsystem according to a certain rule, and hand the testing subsystems over to the subsystem management module 305 after the registration is successfully fulfilled;

the subsystem management module 305 is configured to maintain the clients and the testing subsystems, and assist other modules to fulfill locating of each subsystem;

the subsystem inquiry module 306 is configured to provide testing subsystem inquiry service to the clients, so that the users can designate the operating testing subsystem for each test item in the test task when writing the test task at the client, thereby assisting to fulfill the comprehensive service test;

the test task control module 307 is configured to be responsible for resource allocating, searching and destroying the test task, and respond a task control command from the client;

the test task analysis module 308 is configured to analyze the test task sent by the client, thereby transforming the test task into a format that could be identified and scheduling by the scheduling server;

the test task/item mapping module 309 is configured to maintain a corresponding relationship among the test task/items, the clients and the testing subsystems, and assist to perform the task scheduling;

the test task scheduling module 310 is configured to identify and schedule the test logic of the test task, which is the core module in the scheduling server; and the test task report module 311 is configured to fulfill creation and statistic functions of the test task reports, and provide a complete test task operating report source file to the client; and meanwhile, to assist the clients to fulfill monitoring of the operating state of the test tasks, so that the users can master the operating condition of the test tasks.

In the automatic test system shown in FIG. 1, the module structural diagram of the service testing subsystem 103 is shown in FIG. 4, and the service testing subsystem 103 comprises:

a message communication module 401 is configured to fulfill network message communication between the testing subsystem and the scheduling server;

a file transmission module (subsystem) 402 is configured to receive test item file sent by the scheduling server, and upload the test item execution report and attaching files of the report;

a exception handling module 403 is configured to provide to other modules the universal service for the exception state processing;

a deployment module 404 is configured to perform establishing of the interaction channel(s) between the testing subsystem and the tested system(s), so that the testing subsystem can control the tested system(s); wherein the implementation method is determined according to the specific condition, for example, TCP/IP communication mode or the mode that the testing subsystem is directly resident in the tested system can be applied;

a registration module 405 is configured to be responsible for the registration from the testing subsystem to the scheduling server;

a test task analysis module 406 is configured to analyze all execution instructions in the received test items, thereby transforming the instructions into a form that can be executed by the testing subsystem;

a test item scheduling module 407 is configured to be responsible for executing and scheduling the execution instructions in the test items;

a scheduling control module 408 is configured to be responsible for controlling the scheduling of the instructions, such as starting up, pausing, continuing or stopping the scheduling; and a test item report module 409 is configured to collect the instruction execution reports, and collect the test item reports after the test items have been executed.

Figures 5, 6:
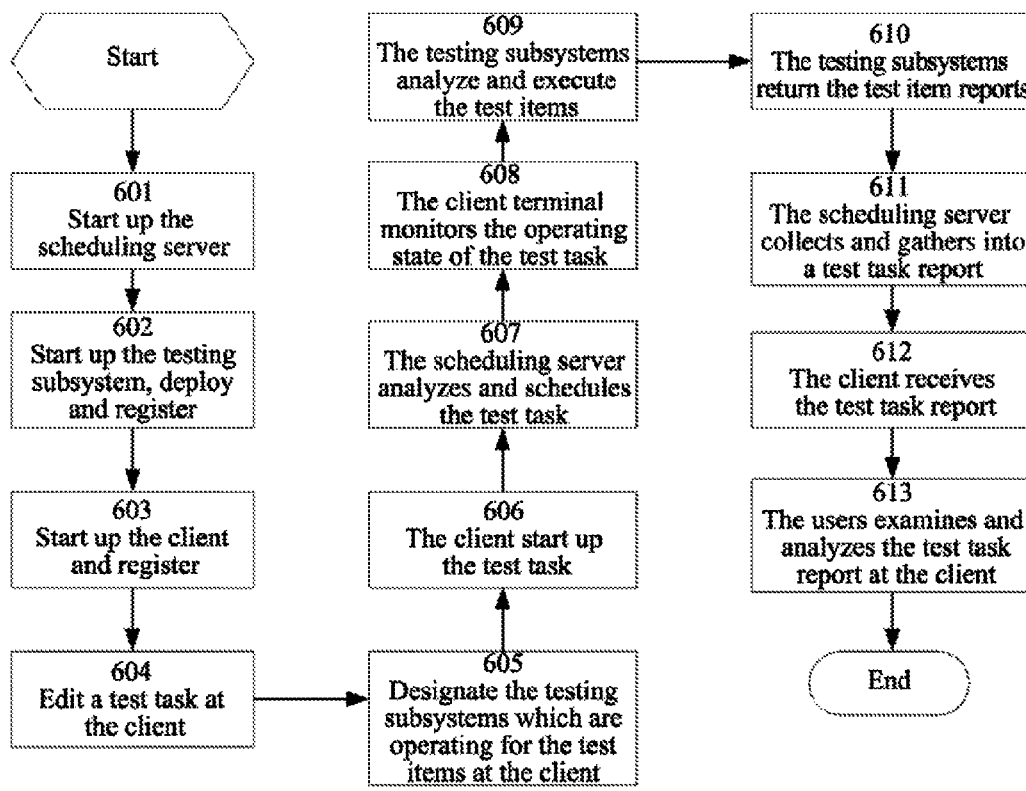
FIG. 5 is a module diagram of a client 101 in accordance with the present invention.
FIG. 6 is a flow chart of an execution of an automatic test method in accordance with the present invention.

In the automatic test system shown in FIG. 1, the module structural diagram of the client 101 is shown in FIG. 5, and the client 101 comprises:

a message communication module 501 is configured to fulfill the network message communication between the client and the scheduling server;

a file transmission module (client) 502 is configured to send the test task to the scheduling server, and receive the test task report from the scheduling server;

a exception handling module 503 is configured to provide to other modules the universal service for the exception state processing;

a registration module 504 is configured to register on the scheduling server;

a test task management module 505 is configured to create, modify, delete, import and export the test task;

a subsystem inquiry module 506 is configured to inquire of the available testing subsystems from the scheduling server so as to allocate the operating testing subsystems for different test items;

a supporting module 507 is configured to provide assistant functions, such as variable support, parameter management and test task synchronization, to the test task management module 505;

a test case edition module 508 is configured to edit the most important test case in the test task, for example, it can edit a structuralized case;

a operation monitoring module 509 is configured to let the users observe the test task operating condition at the client when the scheduling server schedules the test task; and a task operation control module 510 is configured to control the operating state of the test task and support the test task start-up, pause and stop, thereby working with the scheduling server to control the operating state of the test task.

FIG. 6 shows a flow chart of an automatic test method for the distributed comprehensive service in the present invention, and the method comprises the following steps:

step 601, start up the scheduling server;

step 602, start up the testing subsystem to deploy and register on the scheduling server;

step 603, start up the client to register on the scheduling server;

step 604, create and edit a test task at the client, wherein the test task consists of test items according to the logical relationship, and select for the test task or add to the test task test items corresponding to different testing subsystem;

step 605, designate the operating testing subsystems for the test items at the client;

step 606, start up the test task at the client;

step 607, the scheduling server analyzes and schedules the test task;

step 608, monitor the operating state of the test task at the client;

step 609, the testing subsystems analyze and execute the test items;

step 610, the testing subsystems return the test item reports;

step 611, the scheduling server collects the test item reports from different testing subsystems and gathers them into a test task report;

step 612, the client receives the test task report;

step 613, examine and analyze the test task report at the client.

Figure 7:
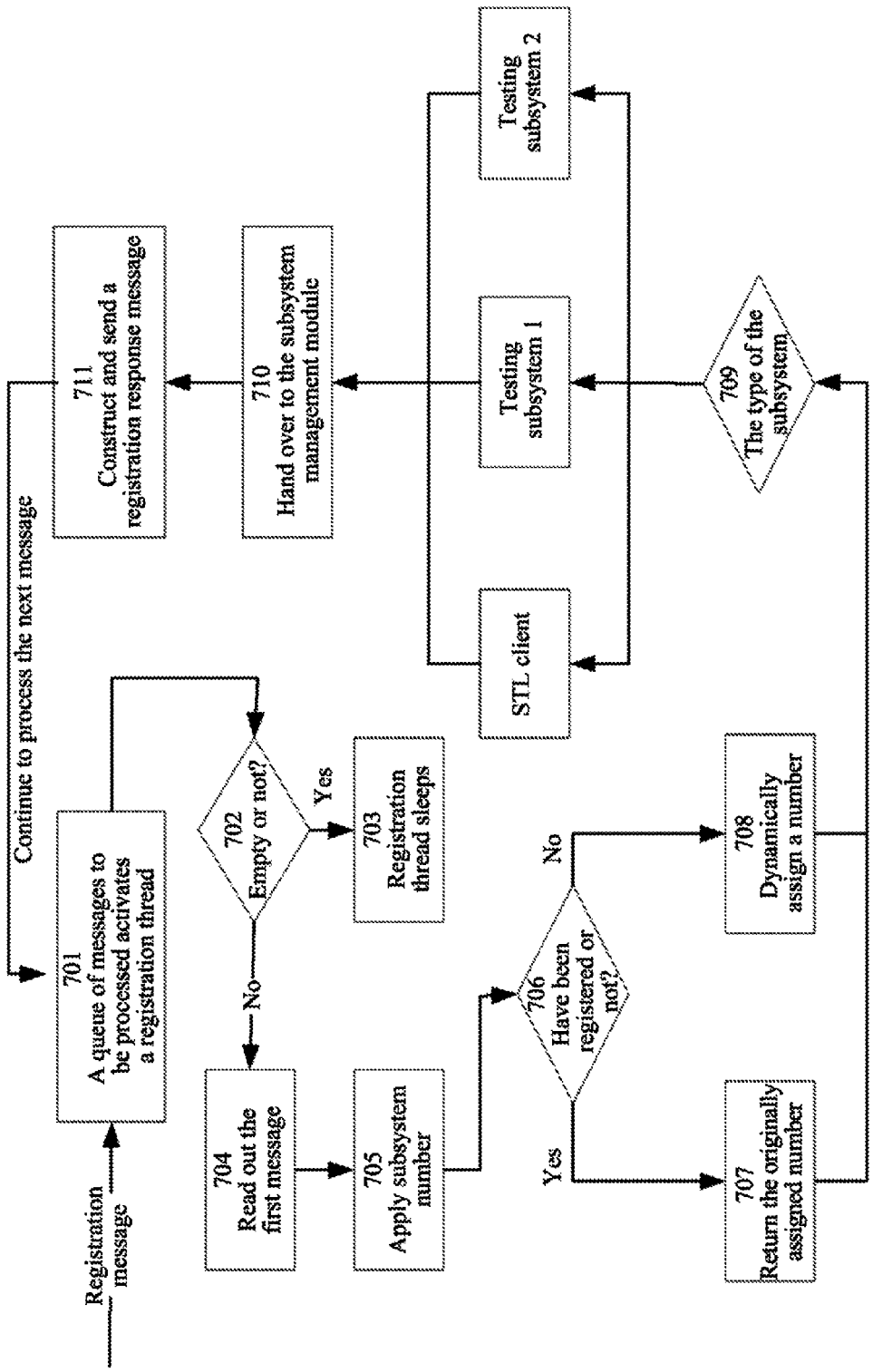
FIG. 7 is a flow chart of registration and response of a scheduling server in accordance with the present invention.

In the automatic test method of the present invention shown in FIG. 6, during the registration process shown in step 602 and step 603, the registration process by the scheduling server is shown in FIG. 7:

start, the scheduling server receives a registration message from the subsystem (client/testing subsystem);

step 701, put the registration message into a queue of messages to be processed, and activate a registration thread;

step 702, the registration thread checks whether the length of the queue of messages is empty or not?

step 703, if the registration thread finds out that the queue of messages is empty, enter into a sleeping state;

step 704, if the registration thread finds out that the queue of message is not empty, read out the first message in the queue;

step 705, the registration thread applies a subsystem number from the subsystem management module 305; the subsystem number subsequently acts as the unique ID of the subsystem and is the result inquired by the subsystem inquiry module 306, and it can be used for identifying the operating testing subsystems for the test items;

step 706, the subsystem management module 305 checks the validity of the subsystem applying for the number and checks whether that subsystem has been registered or not;

step 707, if the subsystem applying for number has been registered, assign the original number, and proceed to step 709;

step 708, if the subsystem applying for the number is not registered, assign a new number, and proceed to step 709;

step 709, the registration thread judges the type of the registered subsystem;

step 710, the registration thread hands the registered subsystem over to the subsystem management module 305 to manage;

step 711, the registration thread constructs a registration response message and sends it to the registered subsystem.

After the process of one registration message has been done, the process can be returned to step 701 to continuously process the next message.

Figure 8:
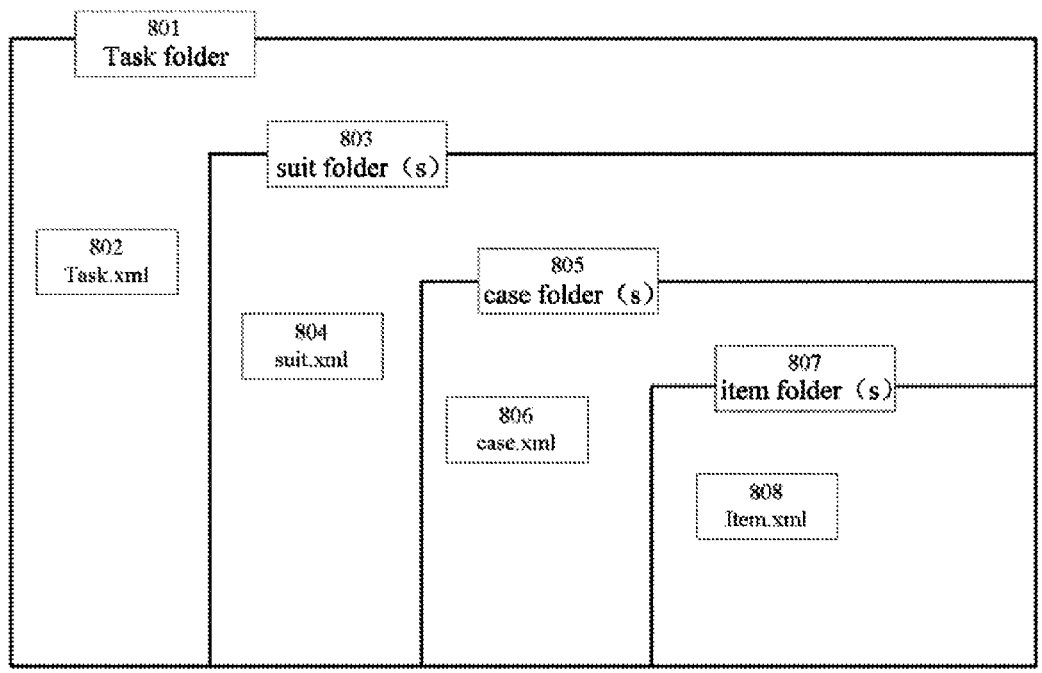
FIG. 8 is a structural diagram of a test task file in accordance with the present invention.

In the automatic test method of the present invention shown in FIG. 6, in the forth step 604, the test task is managed by using the form of folder, and its structure is shown in FIG. 8.

There is a file 802 named task.xml and at least one test suit folder 803 in a test task folder 801; there is a file 804 named suit.xml and at least one test case folder 805 in each test suit folder 803; there is a file 806 named case.xml and at least one test item folder 807 in each test case folder 805; there is one test item file 808 whose format is xml and whose name can be named as needed in each test item folder 807.

In the levels of the test task file, the xml file (except of the test item file 808) in each level has part of content specially identifying the relationship between the indexes that have the same level as that xml file. In that xml file, each same-level index corresponds to one logic node, and each logic node has two IDs, wherein one is its own ID and the other one is the ID of the same-level logic node to be run next during scheduling. The scheduling rule is that: the test suit only supports the sequential scheduling, and the test case supports the sequence and cycle, and the test item in the test case case.xml supports scheduling rules such as branch, cycle, and concurrency, and also provides delay and evaluation to assist the scheduling.

When scheduling the test task, both each scheduling rule and each index in the test task are analyzed into the logic nodes; and then when scheduling the upper level logic node, the lower level scheduling rule corresponding to that logic node will be searched, the logic nodes at each level can be scheduled by adopting depth-first method. The method for scheduling the logic nodes please refers to the part related to the scheduling server below.

Figure 9:
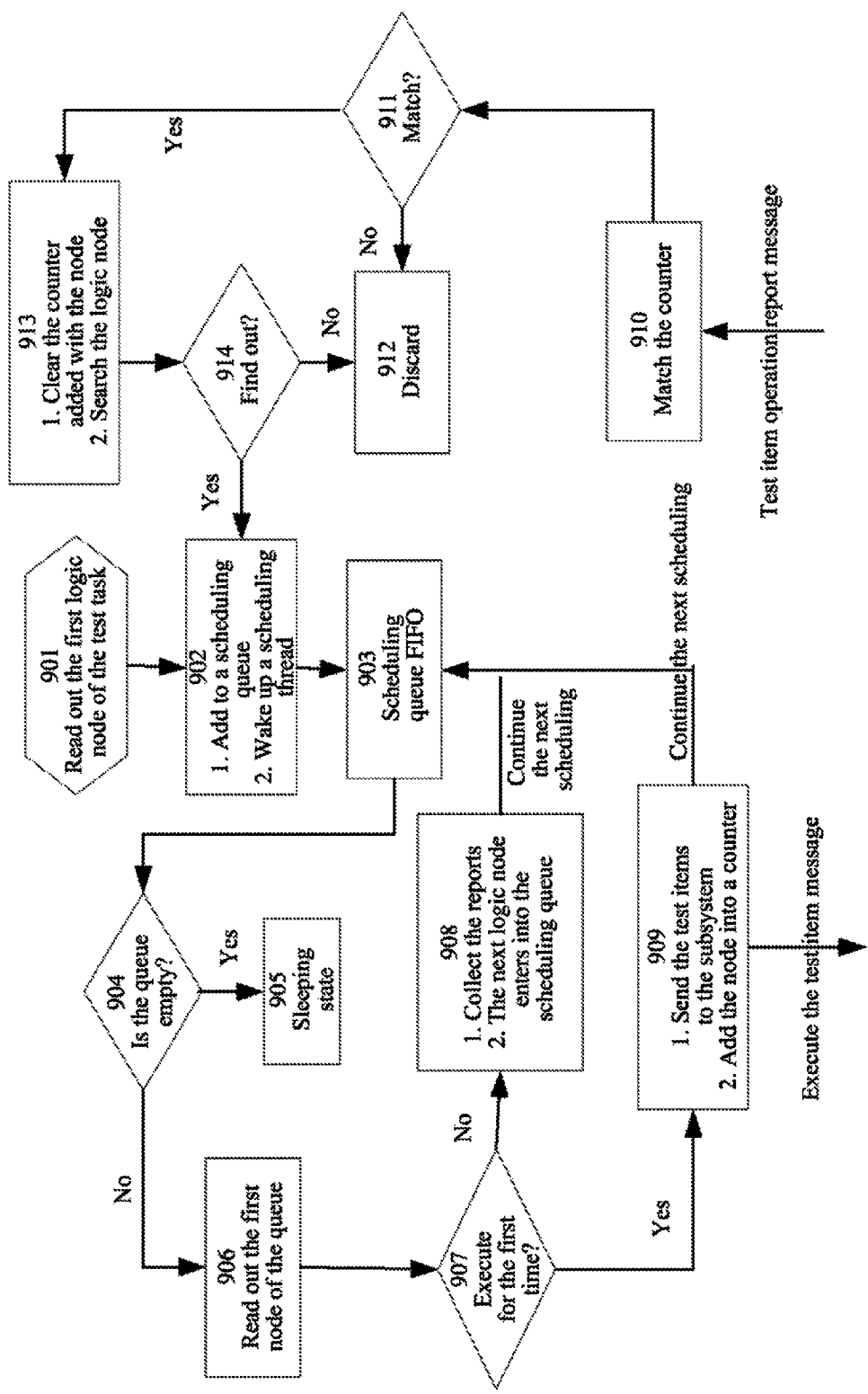
FIG. 9 is a flow chart of a scheduling server scheduling a test task in accordance with the present invention.

In the automatic test method of the present invention shown in FIG. 6, in step 607, the scheduling process in the scheduling server is shown in FIG. 9, and it comprises:

step 901, after analyzing the test task, the scheduling server finds out the first node of that test task;

step 902, the scheduling server adds the first node at the end of a scheduling queue and wakes up a scheduling thread;

step 903, the scheduling thread reads out the scheduling queue;

step 904, the scheduling thread judges whether the scheduling queue is empty or not?

step 905, if the scheduling queue is empty, the scheduling thread enters into the sleeping state and waits to be activated;

step 906, if the scheduling queue is not empty, read out the first node in the scheduling queue;

step 907, the scheduling thread judges whether the read-out node is executed for the first time or not;

step 908, if the node is not executed for the first time, collect the reports, and finally add the logic node next to that node into the scheduling queue, and proceed to step 903 to continue the scheduling;

step 909, if the node is executed for the first time, and the first node is a test item logic node, search the testing subsystem according to the test item type and the designated operating subsystem number, and send that node to the corresponding testing subsystem by the FTP mode or other modes, meanwhile, add location information of the node into a counter and send the message for executing the test items, and afterwards, enter into step 903 to continue the scheduling; and if the first node is not a test item logic node, call the corresponding method of the logic node, and then enter into step 903 to continue the scheduling;

step 910, after the scheduling server receives the test item report message sent by the subsystem, it firstly searches the logic node corresponding to the report and matches the logic node with the record in the counter;

step 911, the scheduling server judges whether the counter has location information of the node corresponding to the report or not;

step 912, if there is no location information of the node corresponding to the received report in the counter, discard the report;

step 913, if there is a location information of the node in the counter to match the logic node, clear the location record of that node in the counter and find out the logic node;

step 914, the scheduling server judges whether it finds out the logic node corresponding to the report or not; if no, proceed to step 912 to discard the node; if yes, proceed to step 902 to continue to activate the scheduling.

Figure 10:
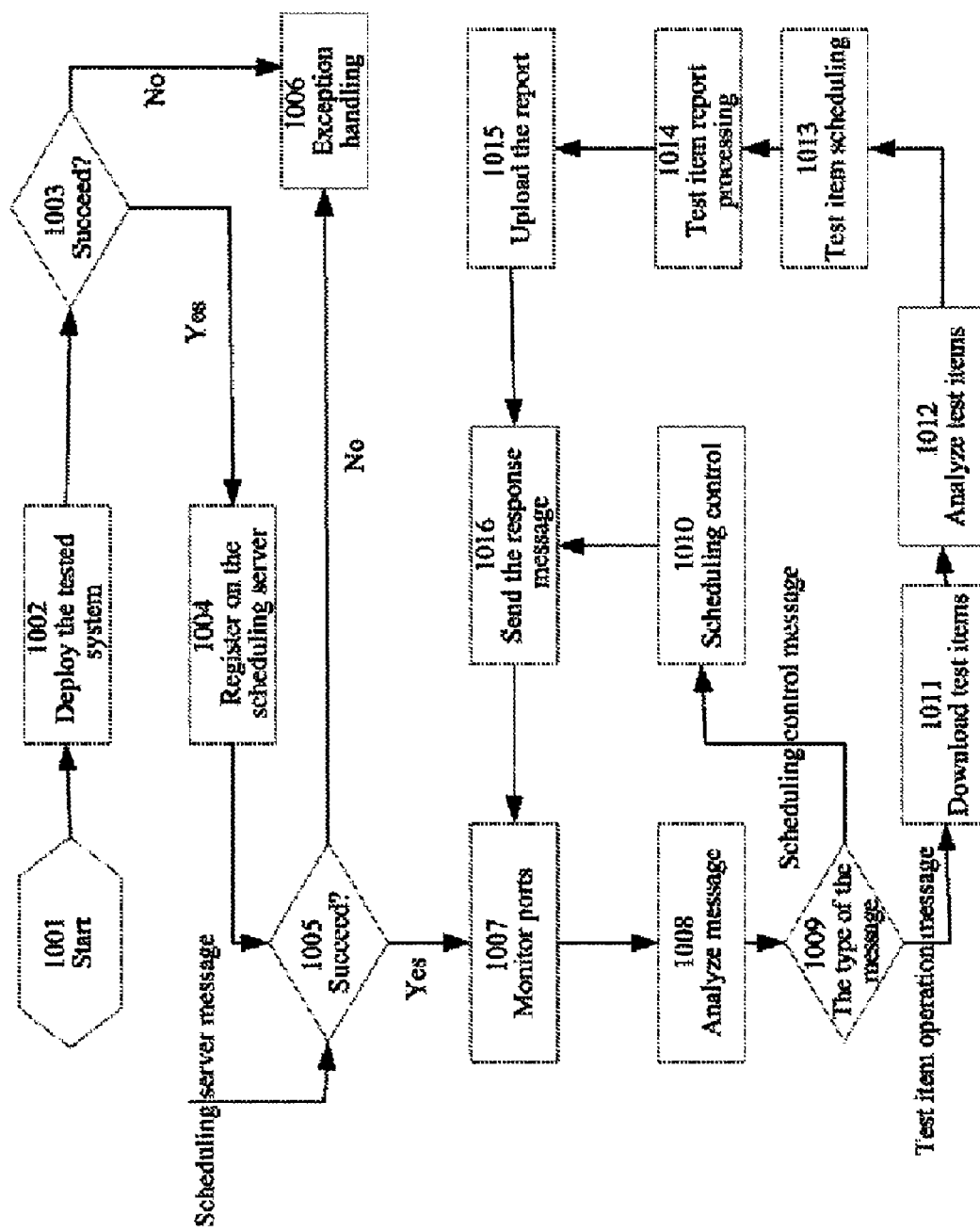
FIG. 10 is a flow chart of an execution of a testing subsystem in accordance with the present invention.

In the automatic test method of the present invention shown in FIG. 6, the execution process of the testing subsystem is shown in FIG. 10:

step 1001, start to use the testing subsystem step 1002, the testing subsystem starts to deploy the tested system at first to establish the interaction channel between the testing subsystem and the tested system;

step 1003, judge whether it succeeds in deploying or not, and if failing to deploy, forward to exception handling step 1006;

step 1004, if it succeeds in deploying, register on the scheduling server;

step 1005, judge whether it succeeds in registering or not; and if failing, forward to exception handling step 1006;

step 1007, if it succeeds in registering, monitor messages from the scheduling server;

step 1008, when receiving a message from the scheduling server, firstly analyze that message;

step 1009, judge the type of the message;

step 1010, if the message is a scheduling control message, perform the scheduling control, and after processing the message, send a response message 1016;

step 1011, if it is a test item operation message, firstly download the test items;

step 1012, analyze the execution instructions in the test items;

step 1013, schedule and execute the execution instructions in the test items;

step 1014, collect the execution conditions of instructions and the related attachments, and create a test item report;

step 1015, upload the test report to the scheduling server;

step 1016, send the test item response message to the scheduling server; afterwards, continue to monitor the port and process other messages.

The above description is only the embodiments of the present invention and is not intended to limit the present invention. For those skilled in the art, it can be understood that there may be a variety of modifications and variations in the present invention. All of modifications, equivalents and/or variations without departing from the spirit and essence of the present invention should be embodied in the scope of the appending claims of the present invention.

Industrial Applicability

The automatic test system and method for distributed comprehensive service in the present invention achieves distribution via the network connection among the clients, the scheduling server and the testing subsystems in the system, and achieves supporting of the complicated multi-service test scenario by distinguishing the types of the test items, designating the test systems for operating the test items and supporting the structuralized test script in the test case; moreover, the system also supports execution modes such as concurrency, sequence, and timing of a plurality of test tasks, and controls whether to operate each part in the test task or not; and, with the system, the test width and depth can be significantly extended and the test efficiency can be extremely improved.

What is claimed is:

1. An automatic test platform for distributed comprehensive services, comprising two or more hardware clients, a hardware scheduling server and two or more hardware testing subsystems, wherein one hardware testing subsystem is only connected with one hardware scheduling server, and is only connected with one hardware to-be-tested system, and one hardware to-be-tested system is connected with one or more hardware testing subsystems; wherein:

each said hardware client is configured to generate at least one test task by organizing a plurality of test items according to a logic relationship, and after starting up a test, send the at least one test task to the hardware scheduling server; wherein, each of the test items is a basic test script identified and executed by a corresponding hardware testing subsystem, and the said test item has a unique type identification (ID) which has a one-to-one relationship with said corresponding hardware testing subsystem, the logical relationship includes primary scheduling rules which comprise branching, looping and concurrent execution rules, and auxiliary scheduling rules which comprise delay and value assignment, and the test task includes the plurality of different task items in which some task items can correspond to one hardware to-be-tested system and some other task items can correspond to another hardware to-be-tested system;

said hardware scheduling server, which supports concurrent scheduling of a plurality of test tasks, is configured to analyze the test task sent by the hardware client, schedule the test items organized in the test task according to the logical relationship, distribute each of the test items to the corresponding hardware testing subsystem according to the type identification;

each hardware testing subsystem is configured to analyze the test item which is received from the hardware scheduling server and the type identification of which corresponds to this hardware testing subsystem, execute the analyzed test item so as to test the hardware to-be-tested system, and collect a test item execution report corresponding to the analyzed test item and report to the hardware scheduling server;

the hardware scheduling server is further configured to collect test item execution reports reported by the two or more hardware testing subsystems, and generate a test task report to be examined by the hardware client, wherein the test task report includes the test item execution reports corresponding to all the test items organized in the said at least one test task; and the hardware client is further configured to receive the test task report sent from the hardware scheduling server and examine the test task report.

2. The automatic test platform of claim 1, wherein, said hardware client is further configured to monitor the state of the test task in real time, and pause, resume or stop the scheduling by the hardware scheduling server; and said hardware scheduling server is further configured to send real-time execution state information of the test task to the hardware client to perform real-time monitor during scheduling the test task.

3. The automatic test platform of claim 1, wherein, said test task is managed in a form of logical level folder, which is called as a test task folder; wherein the test task folder contains one task file and at least one test suit folder, each test suit folder contains one test suit file and at least one test case folder, each test case folder contains one test case file and at least one test item folder, and each test item folder contains one test item file;

wherein, based on the scheduling rules, the task file maintains a relationship of the test suit folders, the test suit file maintains a relationship of the test case folders, and the test case file maintains a relationship of the test item folders; and in each file, each folder maintained by that file records as one logic node, and each logic node has two IDs, wherein one is an ID of the folder itself and the other one is an ID of the same-level folder to be run next during scheduling; and the test item file contains one test item which is a set of a series of operations which can be identified and executed by the corresponding hardware testing subsystem.

4. An automatic test method for distributed comprehensive services, comprising: two or more hardware clients, a hardware scheduling server which supports concurrent scheduling of a plurality of test tasks and two or more hardware testing subsystems being in a test platform in which-two or more hardware testing subsystems, and the method comprising:

each hardware client generating at least one test tasks by organizing the plurality of test items according to a logical relationship, and sending the test tasks to the hardware scheduling server after starting up a test, wherein, each of the test items is a basic test script identified and executed by a corresponding hardware testing subsystems, and the said test item has a unique type identification (ID) which has a one-to-one relationship with said corresponding hardware testing subsystem, the logical relationship includes primary scheduling rules which comprise branching, looping and concurrent execution rules, and auxiliary scheduling rules which comprise delay and value assignment, and the test task includes the plurality of different task items in which some task items can correspond to one hardware to-be-tested system and some other task items can correspond to another hardware to-be-tested system;

the hardware scheduling server analyzing the test task sent by the hardware client, scheduling the test items organized in the test task according to the logical relationship, and distributing each of the test items to the corresponding hardware testing subsystem according to the type identification;

each the hardware testing subsystem analyzing the test item which is received from the hardware scheduling server and the type identification of which corresponds to this hardware testing subsystem, executing the analyzed test item so as to test the hardware to-be-tested system, and collecting a test item execution report corresponding to the analyzed test item and reporting to the hardware scheduling server;

the hardware scheduling server collecting test item execution reports reported by the two or more hardware testing subsystems, and generating a test task report to be examined by the hardware client and sending the test task report to the hardware client, wherein the test task report includes the test item execution reports corresponding to all the test items organized in the said at least one test task; and the hardware client receiving the test task report which corresponds to the test tasks and is sent from the hardware scheduling server, and examining the test task report.

5. The automatic test method of claim 4, wherein, said test task is managed in a form of logical level folder, which is called as a test task folder; wherein the test task folder contains one task file and at least one test suit folder, each test suit folder contains one test suit file and at least one test case folder, each test case folder contains one test case file and at least one test item folder, and each test item folder contains one test item file;

wherein, based on the scheduling rules, the task file maintains a relationship of the test suit folders, the test suit file maintains a relationship of the test case folders, and the test case file maintains a relationship of the test item folders; and in each file, each folder maintained by that file records as one logic node, and each logic node has two IDs, wherein one is an ID of the folder itself and the other one is an ID of the same-level folder to be run next during scheduling; and the test item file contains one test item which is a set of a series of operations which can be identified and executed by the corresponding hardware testing subsystem.

6. The automatic test method of claim 4, further comprising:

during scheduling the test task, the hardware scheduling server sending real-time execution state information of the test task to the hardware client to perform real-time monitor;

the hardware client monitoring the state of the test task in real time, and pausing, resuming or stopping the scheduling by the hardware scheduling server.

7. The automatic test platform of claim 1, wherein, said hardware client is further configured to inquire the hardware scheduling server to find out the available hardware testing subsystems that are registered to said hardware scheduling server to allocate different test items to the operating hardware testing subsystems.

* * * * *